Nov. 30, 1937.   L. G. ROWNTREE   2,100,613

CLINICAL SURFACE THERMOMETER

Filed Nov. 21, 1936

INVENTOR,
Leonard G. Rowntree,
BY J. Stuart Freeman,
ATTORNEY.

Patented Nov. 30, 1937

2,100,613

UNITED STATES PATENT OFFICE 2,100,613

CLINICAL SURFACE THERMOMETER

Leonard G. Rowntree, Philadelphia, Pa.

Application November 21, 1936, Serial No. 112,092

5 Claims. (Cl. 73—374)

The object of the invention is to provide improvements in clinical surface thermometers, such as are used by doctors, nurses and others, for determining the internal temperature of a patient from a suitable external surface, whether it be certain portions of the skin or of membranes, the devices hereinafter described comprising improvements over U. S. Letters Patent No. 2,037,201, issued to me on April 14, 1936.

More specifically, the object of the present invention is to provide a clinical thermometer, comprising a disc-shaped bulb having a substantially planular external heat absorbing and radiating or operating surface, adapted to contact with a skin or membrane surface of a patient, together with a surrounding shield, which serves as a lateral protection for said bulb and is especially characterized by a terminal edge portion, which lies in a plane fixedly spaced slightly beyond or outwardly of the plane of the adjacent operating or contact surface of said bulb, while said shield is also pierced by one or more apertures, adapted to permit the inflow and outflow of air, as the patient's skin or membrane enters said shield slightly, before contacting evenly with the said operating surface of said bulb. Such a shield obviously prevents the skin or membrane from rolling upwardly around the more abruptly curved sides of the bulb, while means is also provided for preventing said shield from shifting longitudinally of the axis of the thermometer.

Figure 1:
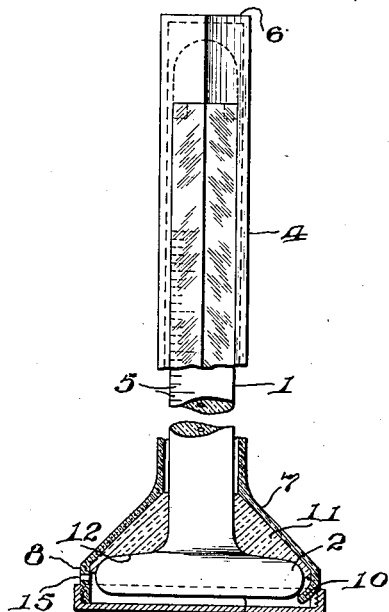
Figure 2:
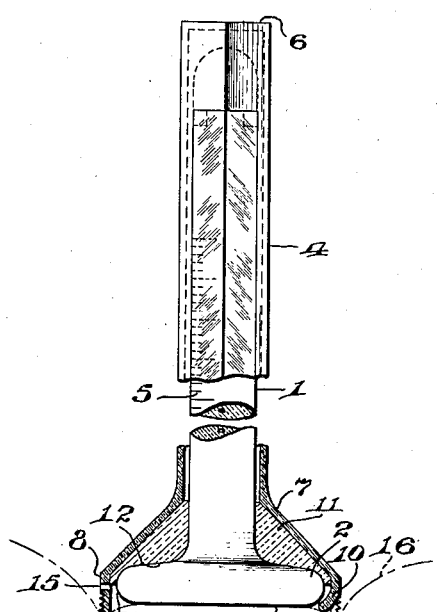
Figure 3:
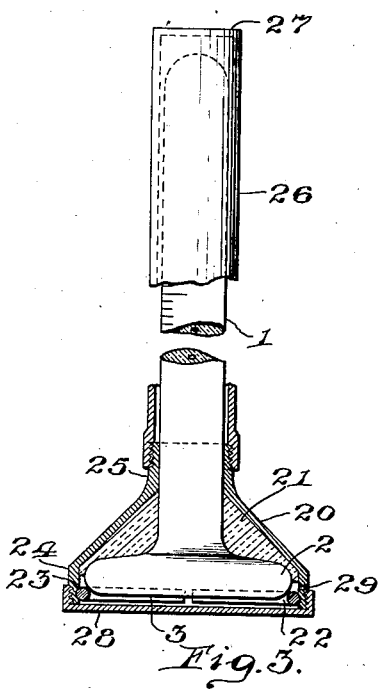
Figure 4:
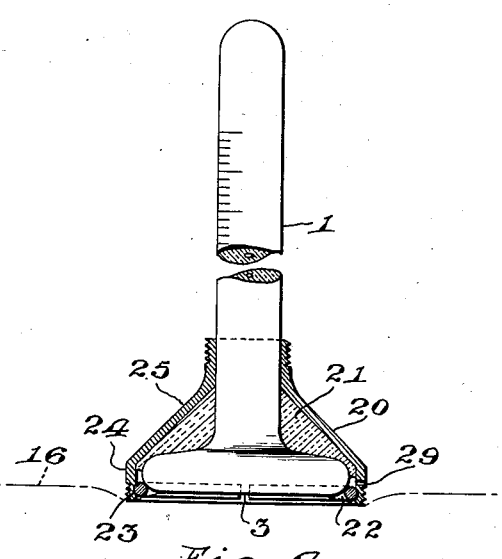

With the objects of the invention thus generally stated, the details of the formation and operation of the invention are hereinafter fully brought out in the following description, when read in conjunction with the accompanying drawing, in which Fig. 1 is a side elevation of a thermometer comprising one embodiment of the invention, with a portion of the shield and protective cap shown in cross-section; Fig. 2 is a similar view, showing the cap removed and the thermometer bulb in operative contact with a skin or membrane surface; Fig. 3 shows a modified form of thermometer, in which the shank portion of the shield can be removed from the bulb portion; and Fig. 4 is a similar view showing the said shank portion and the cap removed and the thermometer in operation, it being understood that each of said figures shows the thermometer in greatly enlarged size, in order to clearly bring out the relatively small but essential details of the device.

Referring to Figs. 1 and 2, a thermometer is shown as comprising a tubular shank portion 1 and a transversely enlarged bulb 2, said bulb being characterized by a substantially planular operating or heat absorbing and radiating contact surface 3. A casing for said thermometer comprises any suitably shaped hollow shank portion 4, which normally surrounds the shank of said thermometer and in the form here shown, the graduations 5 of said thermometer are visible through the transparent material of which the casing shank is formed. Said casing is closed at its normal upper end 6, while at its opposite end it comprises divergent conical sides 7, which at their periphery merge into a cylindrical portion 8, to which a protective cap 9 may be removably secured in any suitable manner, as by means of screw threads or the like. That portion of said shield which surrounds the bulb may, but need not, be of transparent material, but in any case is preferably provided with one or more radially inwardly deflected resilient portions 10 for frictionally engaging and thereby yieldingly retaining the thermometer as a whole within said casing.

Furthermore, it has been found desirable to provide heat-insulating means 11 around the shank 1 and to the rear of the bulb 2, both to prevent relative movement of the thermometer with respect to the casing, and also to minimize the degree of heat transference into and from the annular rear wall 12 of said bulb. Also, the construction here shown in particularly characterized by the fact, that the plane of the free edge portions 13 of the cylindrical terminal portion 8 of said casing lies in slightly spaced relation outwardly of or beyond the plane of the adjacent planular surface 3 of said thermometer bulb. Thus, when the thermometer and its casing, as a unit, are together pressed against the skin or the membrane of a patient, such skin or membrane is prevented from curving upwardly around the relatively abruptly curved lateral portions 14 of the thermometer bulb, as would be the case if it were not prevented by the slightly protruding free edge portion of the casing 8, as hereinbefore referred to, air which is trapped and would otherwise be compressed within said casing, escaping through one or more vents 15.

In Fig. 2 the dot and dash line 16 illustrates the surface of a section of skin or membrane, which is depressed by the thermometer unit, but, due to the casing, is prevented from contacting with any portion of the thermometer bulb other than the substantially planular surface area 3, and with this construction it is assured that repeated use of the thermometer upon a given surface will in all cases contact with the same area of that surface.

Referring to Figs. 3 and 4, a slightly modified form of casing is illustrated, as comprising a conical section 20, which may be of any suitable material and in which the bulb 2 of the thermometer is secured, both by heat insulating material 21 and also by a resilient expansible ring 22, or similar element, which is yieldingly positioned within an annular groove 23, in the inner surface of the terminal cylindrical portion 24 of said casing section 20, the opposite end 25 of said casing section relatively closely surrounding the stem 1 of said thermometer, and being provided with screw threads for detachably securing thereto a cylindrical casing shank 26, the opposite end 27 of which is closed, and which casing shank, when in operative position, fully protects the adjacent portion of said thermometer. The exposed, substantially planular heat absorbing and radiating contact surface 3 is protected, when not in use, by a cap 28, which is detachably secured by screw threads, or the like, to the cylindrical terminal portion 23 of the casing section 20. When it is desired to make use of the thermometer, said cap 28 and casing shank 26 are both removed, as indicated in Fig. 4, and the bulb surface 3 of said thermometer is thereupon applied directly to a skin or membrane surface of a patient, as suggested by the dot-and-dash lines 16.

It is also to be understood that both types of thermometer casings here illustrated may be provided with relatively small apertures or vents 29 for the purpose of relieving the air pressure within the thermometer casing, when the bulb surface is applied to a skin or membrane surface, thereby preventing the internal air pressure which would otherwise be produced from preventing uniform and maximum contact with said bulb surface 3, as hereinbefore described.

Having thus described my invention, what I claim as new and desire to protect by Letters Patent of the United States is:

1. A clinical thermometer, comprising a bulb having a substantially planular contact surface, and a casing surrounding and normally fixed against longitudinal movement with respect to said bulb, heat-insulating material substantially filling the space between said casing and the rear portion of said bulb, and said casing terminating in a plane having a free edge portion, which lies in a plane spaced beyond the plane of said surface.

2. A clinical thermometer, comprising a bulb having a substantially planular contact surface, a casing surrounding said bulb and terminating in a free edge portion, which lies in a plane spaced beyond the plane of said surface, and a vent in said casing to relieve the pressure of air caused by said bulb being pressed into uniform engagement of said contact surface with the skin or membrane of a patient.

3. A clinical thermometer, comprising a bulb having a substantially planular contact surface, a casing surrounding and normally fixed against longitudinal movement with respect to said bulb, said casing terminating in a plane having a free edge portion, which lies in a plane spaced beyond the plane of said surface, and a vent in said casing to relieve the pressure of air caused by said bulb being pressed into uniform engagement of said contact surface with the skin or membrane of a patient.

4. A clinical thermometer, comprising a bulb having a substantially planular contact surface, a casing surrounding and normally fixed against longitudinal movement with respect to said bulb, heat-insulating material between said casing and the rear portion of said bulb, and said casing terminating in a plane having a free edge portion, which lies in a plane spaced beyond the plane of said surface, and a vent in said casing to relieve the pressure of air caused by said bulb being pressed into uniform engagement of said contact surface with the skin or membrane of a patient.

5. A clinical thermometer, comprising a bulb having a substantially planular contact surface, a casing surounding said bulb and terminating in a free edge portion, which lies in a plane spaced beyond the plane of said surface, and resilient means directly engaging and operative to yieldingly mantain said bulb within said casing.

LEONARD G. ROWNTREE.